UNITED STATES PATENT OFFICE.

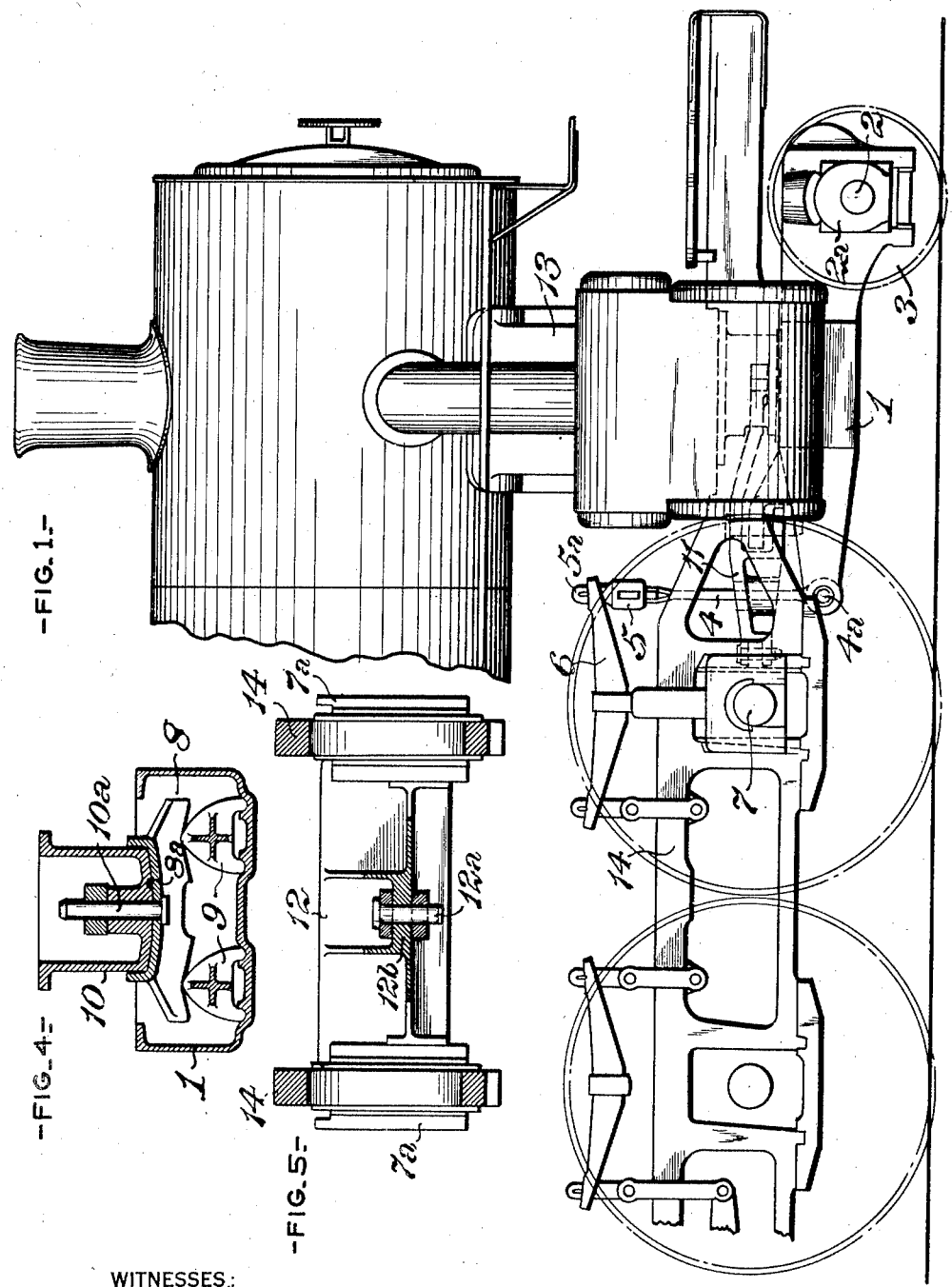

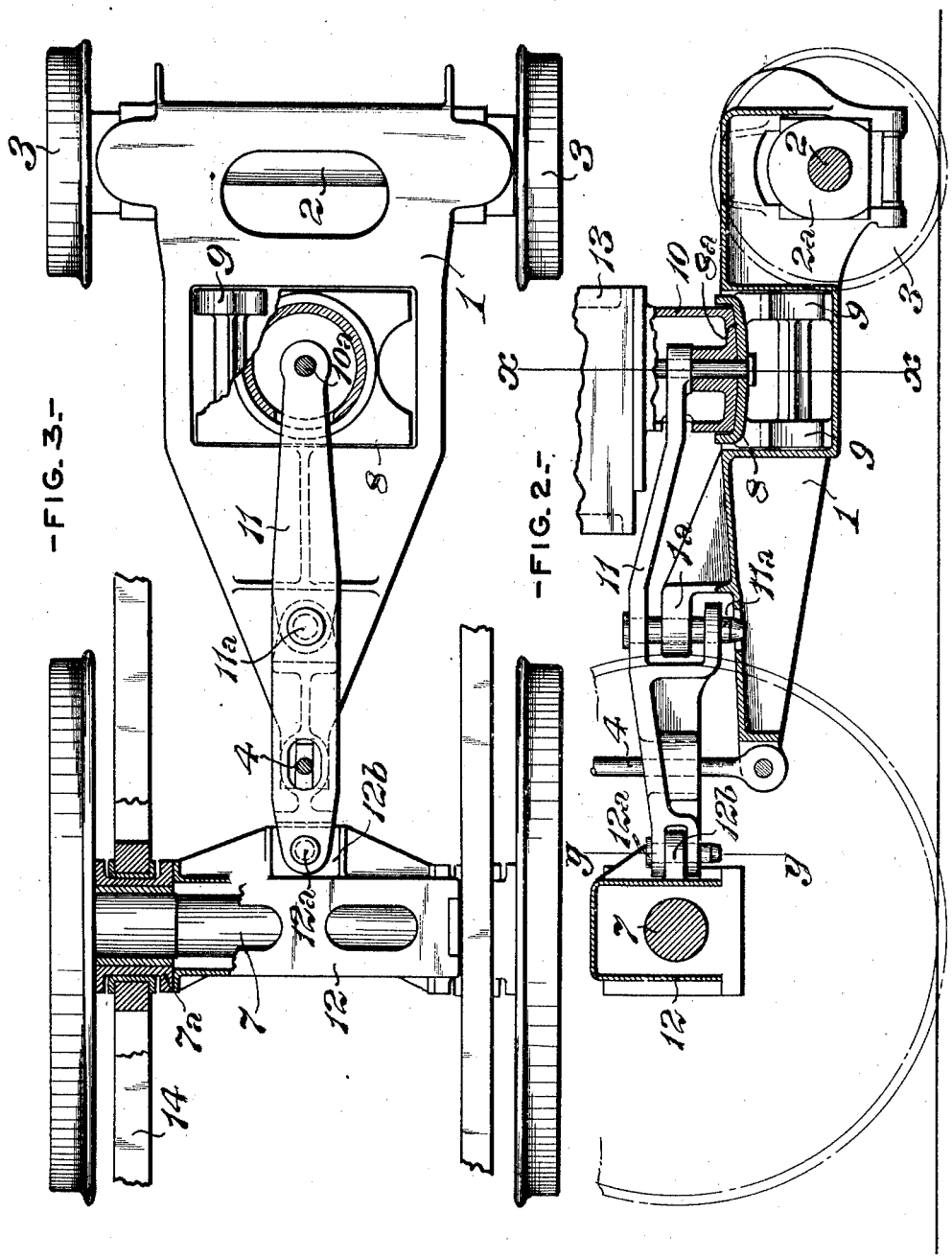

FRANCIS J. COLE, OF SCHENECTADY, NEW YORK.

LOCOMOTIVE-TRUCK.

1,334,738. Specification of Letters Patent. Patented Mar. 23, 1920.

Application filed January 15, 1920. Serial No. 351,570.

*To all whom it may concern:*

Be it known that I, FRANCIS J. COLE, of Schenectady, in the county of Schenectady and State of New York, have invented a certain new and useful Improvement in Locomotive-Trucks, of which improvement the following is a specification.

My invention relates to locomotive trucks of the conjugated type, in which the truck frame performs the function of an equalizer, for the transference of supported weight between the truck wheels and a pair of driving wheels in rear or in front thereof, accordingly as the truck is applied as a leading or a trailing truck.

In trucks of this type, as heretofore constructed, no means have, so far as my knowledge and information extend, been provided for effecting the proper adjustment of the location of the theoretical fulcrum or radial axis of the truck frame, about which it swings in bringing the truck wheels into conformity with the curvature of the track. When, as in prior practice, the radial axis has been located at the point of attachment of the truck to the driving boxes of the driving wheels in rear or in front of the truck frame, as the case may be, the radius bar is found to be unduly long and to fail to maintain the flanges of the truck wheels in proper relation to the outer rails of track curves. With a shorter radius bar, the forward part of the flange is tangent to, or slightly moved away from, the outer rail, but, with the longer bar, the forward part of the flange is always at an angle to the outer rail, so that tendency is induced for the wheel to mount the rail.

My invention provides an auxiliary radius bar, which is pivoted, at one end, to the main frame of the locomotive (in the case of a leading truck, preferably to the center pin between the engine cylinders), and, at its opposite end, to a housing connecting the driving boxes of the adjacent driving axle. Between its end connections, the auxiliary radius bar is coupled to the truck frame by a radial center pin, about which the truck frame is movable, and which may be located in the proper theoretical position, relatively to the distance between the truck axle and the adjacent pair of driving wheels, and the length of the driving wheel base of the locomotive.

The improvement claimed is hereinafter fully set forth.

In the accompanying drawings: Figure 1 is a side view, in elevation, of so much of the forward portion of a locomotive engine, as will illustrate an application of my invention; Fig. 2, a view, partly in side elevation and partly in vertical longitudinal central section, and on a larger scale, of a locomotive truck embodying my invention; Fig. 3, a plan or top view of the same; Fig. 4, a vertical transverse section, on the line $x$ $x$ of Fig. 2; and, Fig. 5, a vertical transverse section through the main frame members, on the line $y$ $y$ of Fig. 2.

In the practice of my invention, referring descriptively to the specific embodiment thereof in a two wheeled leading locomotive truck which is herein exemplified, I provide a truck frame, 1, adjacent to one end of which there are fitted the journal boxes, $2^a$, of a truck axle, 2, upon which are secured the truck wheels, 3. The opposite end of the truck frame is coupled, by a pin, $4^a$, to the lower end of a vertical link, 4, which is connected, at its upper end, to a transverse bar, 5, having standards, $5^a$, on its ends, which constitute the front spring hangers of the springs, 6, of the adjacent driving axle, 7. The portion of the weight of the locomotive which is borne by the truck frame, is transmitted thereto through a swing bolster, 8, supported on any suitable form of lateral motion resistance device, which, in this instance, is shown as a pair of heart shaped rockers, 9, such as are set forth in the Patent of W. E. Woodard, No. 1,060,222, dated April 29, 1913. A center casting, 10, secured to the saddle castings, 13, of the locomotive, which are secured, in the ordinary manner, to the main frame members, 14, thereof, fits on a circular bearing face, $8^a$, on the top of the swing bolster, 8, which, with the truck frame, is movable about the axis of a center pin, $10^a$, passing through the center casting and bolster.

An auxiliary radius bar, 11, is pivotally connected, at its forward end, to the center pin, $10^a$, and, at its rear end, by a pin, $12^a$, to a lug, $12^b$, projecting from the middle of a transverse housing, 12, which is connected, at its ends, to the driving boxes, $7^a$, of the driving axle, 7, nearest the truck, which boxes are, as indicated in Figs. 3 and 5, fitted with the capacity of a substantial degree of lateral motion. Intermediate of its ends, the auxiliary radius bar is connected, by a pivot pin, 11ᵃ, to a lug, 1ᵃ, formed or fixed on the top of the truck frame, in the longitudinal central plane thereof. The pin, 11ᵃ, is located in the theoretical position proper for any determined distance between the axial line of the truck axle, 2, and that of the driving axle, 7, and the length of the driving wheel base.

The practical importance and value of my invention in promoting the effective operation of a locomotive truck in passing curves, by enabling the position of its pivot pin to be properly located, relatively to structural conditions, will be appreciated by those familiar with locomotive construction, as will also be the fact that it is readily applicable, without substantial expense, in connection with trucks of present approved practice.

I claim as my invention and desire to secure by Letters Patent:

1. In a locomotive, the combination, with a truck of the conjugated type, of an auxiliary radius bar, pivotally connected, at its ends, to the main frame of the locomotive and to the boxes of a driving axle thereof, and pivotally connected, intermediately, to the frame of the truck.

2. In a locomotive, the combination of a main frame; a driving axle journaled therein; a truck frame; wheels supporting said truck frame; equalizing means, interposed between said truck frame and the driving axle; and an auxiliary radius bar, pivotally connected, at its ends, to the main frame and to the driving axle boxes, respectively, and pivotally connected, intermediately, to the truck frame.

3. In a locomotive, the combination of a main frame; a driving axle, journaled therein; a truck frame; wheels supporting said truck frame; equalizing means, interposed between said truck frame and the driving axle; a transverse member connecting the boxes of the driving axle; an auxiliary radius bar, pivotally connected, at one end, to the main frame, and, at the other, to said transverse member; and a pivot pin, coupling said auxiliary radius bar, between its ends, to the truck frame.

4. In a locomotive, the combination of a main frame; a driving axle journaled in boxes therein; a truck frame; wheels supporting said truck frame; equalizing means, interposed between said truck frame and the driving axle; a swing bolster, through which weight is imposed on the truck frame; a lateral motion resistance device, supporting said swing bolster, and an auxiliary radius bar, pivotally connected, at its ends, to the main frame, and to the driving axle boxes, respectively, and pivotally connected intermediately, to the truck frame.

5. In a locomotive, the combination of a main frame; a driving axle journaled in boxes therein; a truck frame; wheels supporting said truck frame; equalizing mechanism interposed between said truck frame and the driving axle; a center pin, which is fixed, relatively to the main frame; an auxiliary radius bar, pivotally connected, at one end, to the center pin and, at the other, to the driving wheel boxes; and a pivot pin, coupling the truck frame to the auxiliary radius bar, between the end connections thereof.

6. In a locomotive engine, a truck frame, fitted, at one of its ends, to receive the bearings of a truck axle, and, in rear thereof, adapted to support a center pin bearing, and having an eye for an equalizer connection at its opposite end, and a lug on its top, intermediate of its equalizer connection end and center pin bearing support, to receive an equalizer pivot pin.

FRANCIS J. COLE.

Witnesses:
AGNES WILLUMSEN,
MARY V. COLE.